Dec. 18, 1945.  C. C. MISFELDT  2,391,182
METHOD FOR PRESSURE MOLDING
Filed Jan. 26, 1942
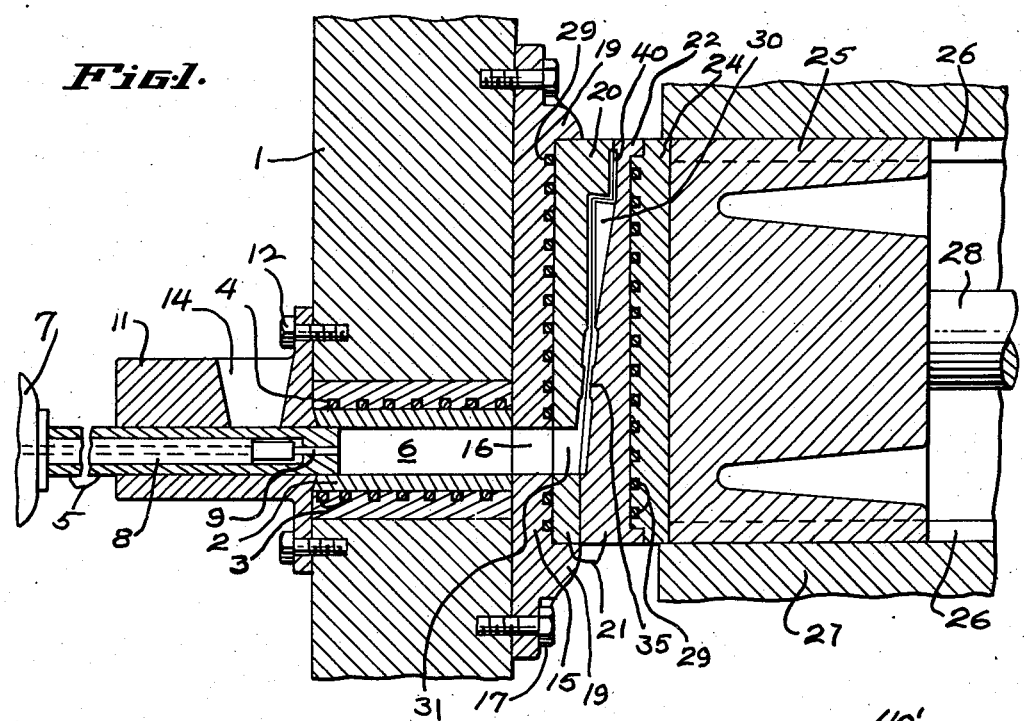
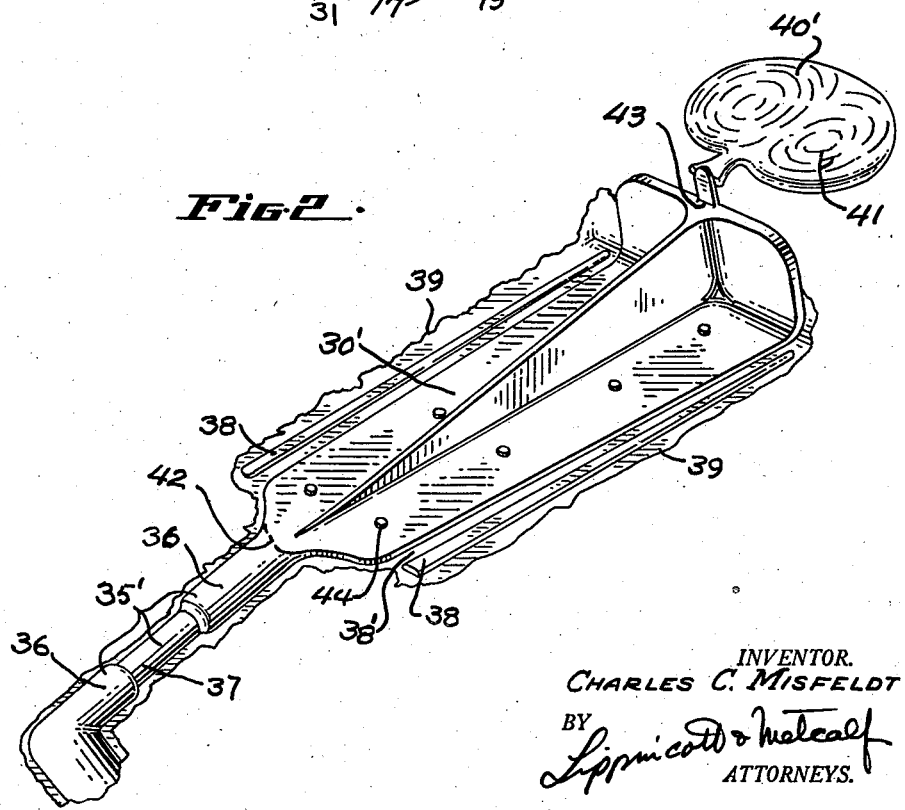
INVENTOR.
CHARLES C. MISFELDT
BY
Lippincott & Metcalf
ATTORNEYS.

Patented Dec. 18, 1945

2,391,182

UNITED STATES PATENT OFFICE 2,391,182

METHOD FOR PRESSURE MOLDING

Charles C. Misfeldt, Glendale, Calif.

Application January 26, 1942, Serial No. 428,147

2 Claims. (Cl. 22—200)

My invention relates to pressure molding and more particularly to a means and method for pressure molding plastics and metals which results in articles having many of the characteristics of drop-forgings, with special reference to the uniformity and perfection of the molded product.

My invention is applicable for use in conjunction with die-casting machines with dies modified to use my invention, and may also be used in conjunction with the extrusion molding machine shown, described and claimed in my prior application, Serial No. 406,254, filed August 11, 1941, Patent No. 2,356,338, August 22, 1944, of which the present application is a continuation-in-part.

In said prior application I have described a machine and method of operating that machine whereby molten or plastic metal may be forced into a die under pressure, with a final and higher pressure being applied to the metal just before it freezes. This higher pressure prevents the formation of large grain size in the molded product, and has a tendency to reduce the occurrence of air bubbles or other defects in the molded product.

The main object of my invention is to provide a means and method of producing improved pressure castings without flaws, inclusions, cold shuts, or shrinkage cracks.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself in any way to the apparatus of the present application, as I may adopt various other apparatus embodiments, utilizing the method within the scope of the appended claims.

Broadly as to apparatus, my invention comprises a split die having a main cavity therein shaped in the form of a final molded product. In addition to this main cavity, however, I provide additional blind cavities in the die connected with the main cavity at strategic locations, so that the entering metal, after flowing through the main cavity, will pass on through the main cavity and into the blind cavities. Thus, the first metal cooled or oxidized by passing through the die, is trapped in the blind cavities and does not form part of the article as finally molded. Means may also be provided to force the metal into the die either in molten or plastic condition, as may be desired, and preferably means are provided to impart to the metal after it has filled the die, a higher pressure just at the time of freezing of the metal in order to reduce grain size, to work the metal, and to impart additional strength thereto. The latter concept is fully described and claimed in my prior filed application cited above.

The main difference in handling plastic metal and molten metal resides in the pressures applied, both for forcing the metal into the die and for the final upsetting pressure. It will be obvious from a perusal of the description of my present specification, that my present method and apparatus can be useful in any case, whether in conjunction with ordinary die casting using low pressures or in conjunction with extrusion molding of plastic metal.

Broadly as to method, my invention comprises forcing metal, either in molten or plastic condition, through a die cavity shaped to define an article to be molded. The first metal through the die cavity, however, is guided into blind cavities to be trapped therein, so that none of this first metal through the die actually becomes a part of the final molded product. Oxidized metal in the molded article is thus entirely eliminated, cold sheets are eliminated, and nothing but clean, non-oxidized metal is present in the article to be molded. Temperatures in the metal of the article are equalized, reducing shrinkage cracks.

Furthermore, I may prefer to form as an inlet to the article cavity, a cavity region defining the outlines of a test bar, so that after the article has been molded the test bar can be removed from the article and subjected to yield point tests or to any other test for which such bars may be valuable.

Articles made in accordance with my invention have sufficient strength to be acceptable in place of sand-castings even though made on a standard die-casting machine, or, in some instances, when higher pressures are used in place of drop-forgings. The means and method described herein has greatly lowered the rejection percentage of such parts as are made by my means and method for aircraft use, for example, where the slightest flaw in the article causes rejection. Such inspection is usually made by X-raying every part before use, and in one particular instance rejections fell from 2–3% to $\frac{1}{10}$ of 1% when my present invention was added to the die and process of production of the same part.

In the drawing:

Fig. 1 is a cross-sectional view of a portion of a machine which may be utilized to practice my method, this figure being a substantial duplicate of Fig. 15 of my prior filed application cited above, with modification of the die cavity to include my present invention.

Fig. 2 is a perspective view of an article molded in accordance with my present invention showing an article as removed from the mold and before trimming.

My invention may be more readily understood by direct reference to the drawing which shows one preferred form of apparatus for performing my method.

A press block 1 is provided with a pressure cylinder 2 surrounded by a heating cylinder 3 having electric heating elements 4 embedded therein, for heating the pressure cylinder. A pressure piston 5 is provided, moved through the cavity 6 of the pressure cylinder by a hydraulic ram 7, this pressure piston being hollow and provided with a movable insert 8, tip 9 of which is utilized to close the end of piston 5. Piston 5 also slides through a loading block 11 attached by bolts 12 to press block 1, loading block 11 having a loading entrance 14 therein opening upwardly to receive molten metal. The opposite side of press block 1 is provided with a die positioning plate 15 having an aperture 16 therein registering with the cavity 6 of the pressure cylinder, this die positioning plate being attached to press block 1 by bolts 17. Shoulders 19 are provided on die positioning block 15, registering with one half 20 of a split die 21, the other half 22 thereof registering with a heating block 24, this heating block being in contact with a piston head 25, sliding in ways 26 on the main frame 27 of the machine to which press block 1 is attached. Piston-head 25 is operated by a hydraulic piston rod 28 to force the two halves of the die together under pressure during the molding procedure.

Die positioning block 15 and heating block 24 are both heated by electric heating elements 29. Thus, the pressure cavity 6 is heated, and both halves of the die block are heated.

The split die 21 is provided with an interior cavity 30 having at one end an inlet 31 registering with aperture 16 and pressure cavity 6. The shape of the main die cavity 30 is, of course, the shape of the article to be molded. However, I also provide auxiliary and preferably blind cavities in the split die, the position of which can be most readily seen by inspection of the final molded article as shown in Fig. 2. In Fig. 2, the article portion 30' is shaped by the contour of the main die cavity 30. The inlet 31 of the die cavity is connected directly to a test rod portion 35 of the cavity in which a test rod 35' is molded between the inlet and the article, this test rod having enlarged portions 36 at each end thereof, and a narrower portion 37 intermediate the enlarged portions.

Along the edges of the main cavity 30 are positioned lateral cavities separated from the main cavity 30 by a small clearance only between the die plates, so that when the die is full, lateral ribs 38 of substantial thickness are formed attached to article 30' by thin fins 38'. The die metal also may be forced through the cavities forming ribs 38, to form lateral fins 39, which are of course paper thin where the metal enters between die plates 20 and 22. The cavities which form ribs 38 are made to be of substantial volume, and to hold a substantial amount of metal.

At the upper end of the die, as I prefer to mount the die in a vertical position, I form a blind cavity 40 communicating with the main cavity 30 at the far end of the article to be molded, so that when the metal flows into this cavity 40 a metal end 40 is formed. The cavity forming this end is made to be of substantial size in order that all of the metal first passing through the main cavity 30 may be received and held therein. I prefer to inject the molten or plastic metal into the die slowly, and the continuous rise of the metal level in the die expels the air and fills the die without atomization. Thus, the first metal flowing into the die, which of course is in contact with the air in the die as it forces the air out of the die between the mating surfaces of the die plates, is received either in lateral ribs 38 and fins 39 or in end 40'. Naturally, this first metal, as it passes through the die, is somewhat cooled in addition to being oxidized, and by forcing the cold metal through and beyond the main cavity, none of this cooled or oxidized metal can be left in the main cavity to form any part of the main article 30' to be molded therein.

Referring again to Fig. 2, I have diagrammatically illustrated on the top surface of end 40' certain flow marks 41 visible to the naked eye on inspection of the end. The mere fact that such marks show on the surface of the metal indicates that the metal is not homogeneous at that point. The marks are due to oxidized metal mixing with the purer metal. Under ordinary circumstances and in ordinary dies, such oxidized metal would form part of the article being molded. With my improved method, however, such contaminated metal is entirely removed from the article as molded, inasmuch as all of the cavities receiving the first metal during the molding are blind and are later cut off. The use of these auxiliary cavities in no way interferes with the final application of pressure during the freezing of the metal.

X-ray inspection of parts made in accordance with my method as outlined above, may often show gas inclusions, oxidation and sometimes cold shuts in ribs 38 and end 40'. At times end 40' will show very definite cold shuts due to premature cooling of the metal flowing into it. In any case, the main cavity 30 fills only with clean, hot metal, and the perfection of the articles molded is greatly increased as to percentage of rejects.

After the article as shown in Fig. 2 has been removed from the die, the test bar 35' may be removed from the article by cutting along dotted line 42 at the junction of the article and the test bar portion, ribs 38 are trimmed from the article and end 40' is removed by cutting along line 43. This removed metal may be refined and reused. The article may then be cleaned up for final use and holes bored in accordance with die marks 44, if desired. No finishing is necessary over the surfaces other than those that have been cut or trimmed, as the final pressure in the die provides the article with its final finish.

While I have described my invention as applied to a particular molded part and with a particular arrangement of blind cavities to receive the first metal passing through the mold, it will be obvious to those skilled in the art, that parts of any size or shape may be formed in accordance with my method by providing at whatever positions it may be deemed necessary along the extent of the article die, blind cavities for the reception of the first metal flowing through the mold. Naturally, the arrangement of such blind cavities and their connection with the main cavity of the mold, will vary greatly in accordance with the shape of the article. It is believed, however, that the teachings of the present application are sufficient for anyone skilled in the art to position such blind cavities in the proper positions around the main cavity in accordance with the flow of the metal therethrough, so that these blind cavities will receive first cooled or oxidized metal passing through the die.

I claim:

1. The process of casting a shaped article which comprises continuously feeding fluid metal into a mold cavity, displacing the air from said cavity and directing it into a communicating closed cavity, the metal being fed under a positively applied force and filling the mold cavity against the pressure of the air displaced from the cavity thereby obtaining freedom from turbulence while the metal fills the cavity, and applying an upsetting pressure to the metal being fed to displace excess metal from said mold into said closed cavity against the continuously increasing air pressure therein, whereby the metal in the mold cavity is densified and the softer metal therein is intimately and uniformly distributed throughout the mass of the metal forming the shaped article and expressing excess metal including any containing occluded air and more completely cooled metal into said closed cavity.

2. The process according to claim 1 wherein the mold cavity has an extension outside the shaped portion, whereby there is formed an integral portion adapted to form a test bar which may be severed from the shaped product without injury to the contour thereof.

CHARLES C. MISFELDT.